April 5, 1966 G. L. WEBB 3,244,934
VEHICLE SIGNAL SYSTEM WITH CONTROL OF ITS LIGHT INTENSITY
Filed Feb. 18, 1965 2 Sheets-Sheet 1

INVENTOR.
George L. Webb
BY
Bair, Freeman, & Molinare
Attys.

United States Patent Office 3,244,934
Patented Apr. 5, 1966

---

3,244,934
VEHICLE SIGNAL SYSTEM WITH CONTROL OF ITS LIGHT INTENSITY
George L. Webb, Lancaster, Ohio, assignor to Essex Wire Corporation, Fort Wayne, Ind., a corporation of Michigan
Filed Feb. 18, 1963, Ser. No. 259,020
12 Claims. (Cl. 315—77)

This invention relates generally to electrical illuminating and signaling means, and more particularly to improvements in dual intensity signaling and illuminating systems of the type particularly useful with motor vehicles.

The majority of motor vehicles in use today are equipped with multipurpose electrical illuminating and signaling systems. For example, such vehicles are commonly provided with illuminating lights, which include both headlights and tail lights and with signaling lights which include the rear stop lights and the flashing turn signal lights. The flashing turn signal lights generally are located at both the front and rear of the vehicle, and also may include additional indicator lights on the dashboard of the vehicle for driver observation. In certain systems, some of the signaling lights may utilize the same filaments as some of the illuminating lights.

Those skilled in the art appreciate that problems have existed in the prior art in regulating the intensity of the signaling lights in the motor vehicle electrical system. Thus, the signaling lights must be of sufficient brilliance to be easily observed under daylight driving conditions, including bright sunlight, but must not be of an intensity during night driving conditions which would result in a glare or undue distraction to other vehicle drivers. Many attempts have been made heretofore to achieve a compromise between these two disparate requirements, but frequently such compromise arrangements add load to the flasher and system switches, or require additional resistors to balance loads, and thereby result in waste of power and increased costs.

Accordingly, it is a general object of this invention to provide a new dual intensity automotive illuminating and signaling system which is a considerable improvement over the dual intensity systems of the prior art.

It is a more specific object of this invention to provide a novel dual intensity automotive illuminating and signaling system which comprises rear illuminating and signal lamps having two filaments connected such that the daylight operation of the turn signals or the brake stop switch causes the two filaments to be energized in parallel from the brake stop switch and turn signal circuits for relatively brighter intensity, and the night operation of the turn signals or the brake stop switch causes only one of the two filaments to be energized from the brake stop switch and turn signal circuits for relatively lower intensity.

It is another object of this invention to provide a novel dual intensity automotive illuminating and signalling system, as above, wherein the operation of the headlight switch for night driving causes the two filaments of each rear lamp to be energized in series and also removes one of said filaments from the brake stop switch and turn signal circuits whereby the operation of the latter during night driving causes only the other filament to be energized from said circuits.

It is still another object of this invention to provide a unique dual intensity automotive illuminating and signaling system comprising a dual intensity rear lamp having a pair of filaments connected such that the filaments are energized in parallel for relatively higher intensity stop light or turn signal operation during daylight driving conditions, and are energized in series for steady rear light illumination during night driving conditions, and are energized in a unique manner for relatively lower intensity stop light or turn signal operation during night driving conditions.

It is a further object of this invention to provide a new and improved illuminating and signaling system, as above, which in one embodiment comprises dual intensity indicator lamps connected in circuit with the rear illuminating and signaling lamps and which also serves to indicate filament failure in such rear lamps.

It is a still further object of this invention to provide such a new and improved illuminating and signaling system which in another embodiment comprises dual intensity indicator lamps each having a pair of filaments connected in a unique arrangement in the flasher circuit for providing higher or lower intensity indications to the motor vehicle driver under the control of the headlight switch.

It is still another object of this invention to provide such a new and improved illuminating and signaling system which in still another embodiment comprises dual intensity rear lamps and dual intensity indicator lamps for desirable daylight and night operation which does not require the use of any relays so as to provide a relatively low cost and trouble-free system.

It is a still further object of this invention to provide a new and improved dual intensity motor vehicle illuminating and signaling system, as above, which is characterized by its efficiency and adaptability to present turn signal switches, stop switches, flashers, and headlight switches without increasing the load on these devices.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

Figure 1:
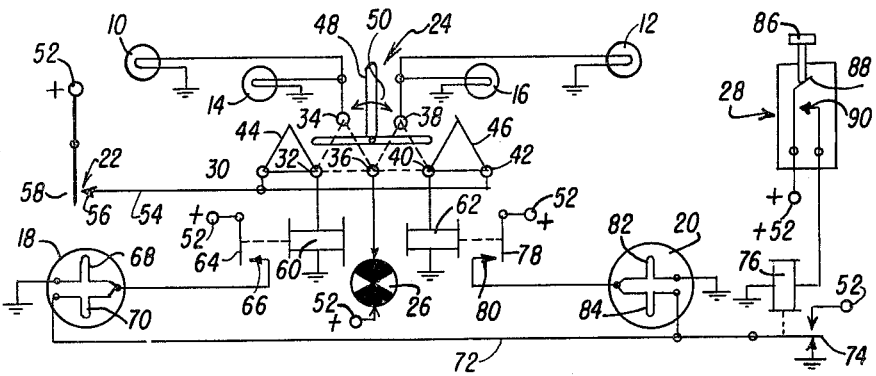
FIGURE 1 is an electrical schematic circuit diagram of one illustrative embodiment of a dual intensity illuminating and signaling system illustrating the principles of the present invention.

Referring now to the drawing, and more particularly to FIGURE 1 thereof, there is shown one illustrative embodiment of the invention which illustrates its basic principles and operation. As shown in FIGURE 1, the novel electrical illuminating and signaling system advantageously is adapted for use in a motor vehicle and comprises a left front turn signal lamp 10, a right front turn signal lamp 12, a left indicator lamp 14, a right indicator lamp 16 (said left and right indicator lamps generally being positioned on the dashboard of the motor vehicle for observation by the driver), a left rear signaling lamp 18, and a right rear signaling lamp 20. For purposes of simplification, and to better illustrate the principles and operation of the present invention, the automobile headlights are not shown in the circuit of FIGURE 1, although those skilled in the art will appreciate that normally, such headlights will be connected to a headlight switch in the illuminating and signaling circuit.

The various signaling lamps identified hereinabove are connected in circuit with a brake stop switch 22, a turn signal switch generally identified at 24, a flasher or circuit interrupter 26, and a headlight switch 28 which, as set forth in greater detail hereinbelow, serve to operate the signaling lamps at a lower intensity output when the headlight switch is operated under night driving conditions.

While the turn signal switch 24 may take any suitable form known in the art, for purposes of illustration, the turn signal switch 24 has been shown as comprising a number of stationary contacts 30, 32, 34, 36, 38, 40, and 42, a pair of movable contact members 44 and 46, with the movable contact member 44 being operatively associated with the stationary contacts 30, 32, 34 and 36, and with the movable contact member 46 being operatively associated with the stationary contacts 36, 38, 40 and 42. The movable contact members 44 and 46 are adapted to be moved from one operating position to another by means of a turn signal operating arm 48 of the type which frequently is positioned on the steering column of a motor vehicle. The turn signal operating arm 48 generally is mounted for selective operation in either a clockwise or counterclockwise direction, as indicated by the arrows 50. Thus, when the turn signal operating arm 48 is moved in one direction to indicate a right turn, the movable contact member 46 is moved from the solid line position to the dotted line position, as shown in FIGURE 1, to complete an electrical circuit between the stationary contacts 36, 38 and 40. Similarly, when the turn signal operating arm 48 is pivoted in the other direction to indicate a left turn, the contact member 44 is moved from the solid line to the dotted line position to complete an electrical circuit between the stationary contacts 32, 34 and 36.

As shown in FIGURE 1, the stationary contact 36 in the turn signal switch 24 is a common contact between both contact members 44 and 46 and is connected to a flasher or circuit interrupter 26 of the type well known in the art for repetitively interrupting the electrical circuit so as to cause the turn signal lamps to blink or flash and provide a warning signal. The flasher 26 is returned to the positive terminal 52 of the power supply, which in a motor vehicle may be a six volt, a twelve volt, or a twenty volt battery, or even a larger battery of any desired size.

The stationary contact 34 of the turn signal switch 24 is connected to the filament of the left indicator lamp 14 and to the filament of the left front turn signal lamp 10. The stationary contact 38 of the turn signal switch 24 is connected to the filament of the right indicating lamp 16 and to the filament of the right front turn signal lamp 12. Stationary contact 30 and stationary contact 42 of the turn signal switch 24 are connected by the conductor 54 to a contact 56 of the brake stop switch 22, the other contact 58 of which is connected to the positive power supply terminal 52. Thus, the depression of the foot brake by the operator of the motor vehicle closes the contacts 56 and 58 of brake stop switch 22 to energize the conductor 54 from the power supply and light the rear signaling lamps 18 and 20, as described hereinbelow.

The stationary contact 32 of the turn signal switch 24 is connected to the relay winding 60, which is returned to ground, while the stationary contact 40 of the turn signal switch 24 is connected to the relay winding 62, which also is returned to ground. The contacts 64 and 66 associated with relay winding 60 are connected in a circuit between the positive power supply terminal 52 and the junction of the filaments 68 and 70 within the left rear signaling lamp 18. The filament 68 is returned to ground while the filament 70 is connected by means of the conductor 72 to an armature contact 74 associated with the relay winding 76 in the headlight switch circuit. The contacts 78 and 80 associated with the relay winding 62 are connected in a circuit with the positive power supply terminal 52 and the junction of the filaments 82 and 84 in the right rear signaling lamp 20. The filament 82 is returned to ground while the filament 84 is connected to the conductor 72 which, as described above, is connected to the movable armature contact 74 associated with the headlight switch relay 76.

The headlight switch 28 comprises a manually operable button 86 which normally is mounted on the dashboard of the motor vehicle and which, when operated, serves to close the circuit between the contacts 88 and 90 for energizing the headlight switch relay winding 76. When the relay winding 76 is not energized, i.e., when the headlight switch is unoperated during daylight driving conditions, the relay armature contact 74 is electrically engaged with a ground terminal. However, during night driving conditions, when the headlight switch 86 is actuated to energize the headlight relay winding 76, the armature contact 74 is placed in electrical contact with the positive terminal 52 of the power supply.

The operation of the inventive system shown in FIGURE 1 now will be described. During daylight driving operation, the headlight switch button 86 will not be operated with the result that the headlight relay winding 76 is not energized and the armature contact 74 associated therewith is connected to ground. This results in ground being connected by the conductor 72 to the filament 84 of the right rear signaling lamp 20 and to the filament 70 of the left rear signaling lamp 18. Thus, the dual filaments in each rear signaling lamp are connected in parallel from their junctions to ground.

When the brake stop switch 22 is operated by the brake foot pedal, a power energizing circuit is completed from the positive terminal 52 of the power supply through the conductor 54 and the stationary contacts of the turn signal switch 24 to energize the relay windings 60 and 62 respectively. The energization of relay winding 60 causes its contacts 64 and 66 to be closed to supply energizing current from the positive battery source 52 to the dual filaments 68 and 70, in parallel, of the left rear signaling lamp 18. Similarly, the energization of the relay winding 62 closes its contacts 78 and 80 to supply energizing current from the positive battery terminal to the filaments 82 and 84, in parallel, of the right rear signaling lamp 20. Thus, operation of the brake stop switch 22 will energize the dual filaments of both rear lamps to cause such lamps to have a relatively higher intensity output of the type necessary for daylight driving conditions.

Also, the operation of the turn signal switch 24 under daylight driving conditions will cause both filaments in each rear lamp to be energized in parallel to provide a blinking or flashing light of relatively higher intensity. This is effected by means of the circuit completed between the flasher 26, the common stationary contact 36 of the turn signal switch 24, the contact member 44 or 46 of the turn signal switch arm 48, dependent upon the direction of rotation of such switch arm, and the associated relay 60 or 62. Since under daylight driving conditions, the energization of either relay 60 or 62 results in the parallel energization of the dual filaments in each rear signaling lamp, a relatively higher intensity output is obtained sufficient to provide a flashing warning signal even in bright sunlight. Also, it will be appreciated that the operation of the turn signal operator arm 48 closes a circuit between the flasher 26 and the respective ones of the front signaling lamps and indicator lamps. Thus, if the turn signal operator arm 48 is rotated to indicate a right turn for example, the contact member 46 will close a circuit between the flasher 26 and the right indicator lamp 16 plus the right front signaling lamp 12 to provide a flashing light observable from the front of the motor vehicle and on the dashboard of the motor vehicle.

Under night driving conditions, however, the headlight switch button 86 will be operated to close its contacts 88 and 90. These, in turn, cause the headlight relay coil 76 to be energized to place the movable armature contact 74 in electrical engagement with the positive terminal 52 of the power supply. The energization of the conductor 72 in this manner then causes the dual filaments in each rear lamp to be energized in series to provide a rear running light for the motor vehicle.

When the brake stop switch 22 or the turn signal switch 24 is operated, the turn signal relay coil 60 or 62 will be energized in the manner described hereinabove. Since, under these conditions, there will be no potential difference across the lamp filament connected to conductor 72 in each rear lamp, signaling current will be supplied only through the remaining ground connected filament of the lamp. For example, if the turn signal relay coil 60 is energized, by either the brake stop switch 22 or the turn signal switch 24, positive potential from the battery source 52 will be supplied to the junction of the two filaments 68 and 70 in the left rear lamp 18. Filament 70 however, is connected at its other end to the positive terminal of the battery by virtue of the contact 74 in the headlight relay and therefore, no signaling current will pass through filament 70. However, signaling current will flow through filament 68 so that the two filaments 68 and 70 are energized in a series circuit arrangement to provide a signaling output having a relatively lower intensity than the signaling output obtained during daylight operation. This lowering of the signaling lamp output under night time conditions prevents interference with the observation ability of the vehicle drivers immediately behind the motor vehicle.

Figure 2:
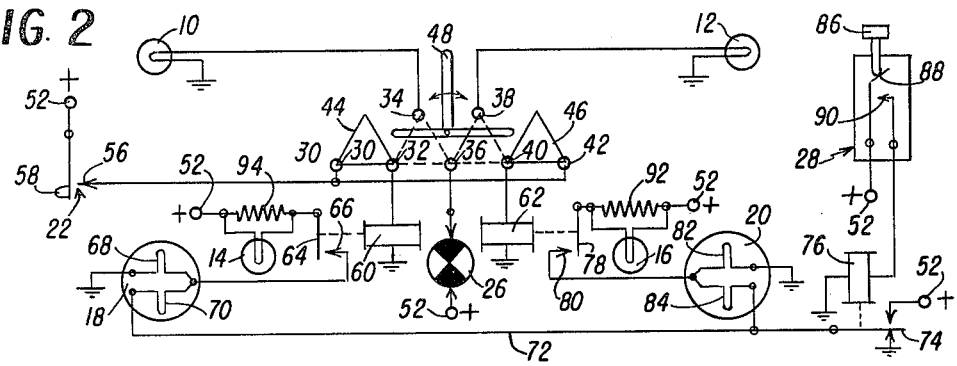
FIGURE 2 is an electrical schematic circuit diagram of another illustrative embodiment of a dual intensity illuminating and signaling system embodying the present invention wherein the indicator lamps are connected in series with the rear lamps for indicating filament failure in the rear lamps as well as providing a turn signal indicating function.

FIGURE 2 illustrates another embodiment of the invention wherein the dashboard indicator lamps 14 and 16 also may be provided with a dual intensity output. In FIGURE 2, the circuit element corresponding to the elements of the FIGURE 1 circuit are identified by the same reference numerals and need not be further described herein. FIGURE 2 circuit differs, however, in that the filaments of each rear signaling lamp are not directly connected to the power supply terminal 52 through the turn signal relay contacts. Rather, the left indicator lamp 14, in parallel with a resistance 94, is connected between the power supply positive terminal 52 and the contact 64 of the left turn signal relay coil 60, while the right indicator lamp 16, in parallel with the resistance 92, is connected between the power supply positive terminal 52 and the contact 78 of the right turn signal relay coil 62.

In the operation of the FIGURE 2 circuit, the energization of the left turn signal relay coil 60, for example, closes its contacts to cause energizing current to flow in series through the indicator lamp 14 and the left rear signaling lamp 18. Similarly, energization of the right turn signal relay coil 62 closes its contact to cause energizing current to flow in series through the right indicator lamp 16 and the right rear signaling lamp 20. When the turn signal switch 24 is operated to provide an interrupted energization of relay coil 60 or 62, this interrupted current flows through the indicator lamps to provide a proper flashing signaling light to the operator of the motor vehicle. Both indicator lamps will be energized at a steady rate when the brake stop switch 22 is operated. As explained above, the current through the rear signaling lamps is decreased under night operating conditions due to the operation of the headlight switch 28 to provide a lower intensity output. Since the current flow through a rear signaling lamp also flows through its associated indicator lamp in the circuit of FIGURE 2, its output will be of a relatively lower intensity under night time driving conditions, thereby preventing any undue interference with the individual observation of the motor vehicle driver.

The resistances 94 and 92 across the indicator lamps 14 and 16, respectively, are provided to prevent interruption of current flow to the rear signaling lamps in the event of indicator lamp filament failure. Also, the indicator lamps serve to provide an indication of filament failure in the rear signaling lamps since the opening of such filaments will interrupt or reduce the current flow through the indicator lamps to warn the driver of this defective condition.

Figure 3:
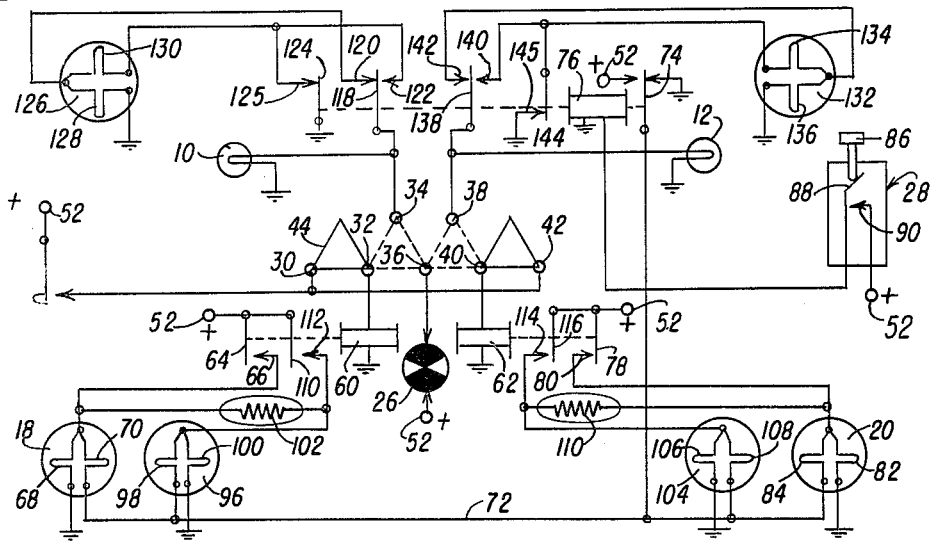
FIGURE 3 is an electrical schematic circuit diagram of still another illustrative embodiment of the invention comprising indicator lamps having filament pairs therein such that the rear lamps and the indicator lamps are of the dual intensity type with a higher intensity output during daylight driving operation and with a lower intensity output during night driving operation.

Another alternative embodiment of the invention is shown in FIGURE 3 of the drawing wherein similar components have been identified by similar reference numerals, with respect to the circuit diagrams of FIGURES 1 and 2. In this embodiment, the dashboard indicator lamps are provided with dual filaments in a manner similar to the rear signaling lamps to provide dual intensity operation, and a pair of separate signaling lamps are used at both the right rear and the left rear of the motor vehicle.

As shown in FIGURE 3, the left rear signaling lamps comprise the lamps 18 having the dual filaments 68 and 70 plus the lamp 96 having the dual filaments 98 and 100. A warning lamp 102 is connected between the junctions of the dual filaments in each left rear signaling lamp such that the failure of a filament in either of the left rear lamps provides an unbalance across warning lamp 102 to indicate such filament failure to the motor vehicle operator. In addition, the junction of the filaments 68 and 70 in signaling lamp 18 is connected to the turn signal switch contact 66 while the junction of filaments 98 and 100 of rear signaling lamp 96 is connected to the turn signal contact 112. Thus, the two left rear signaling lamps 18 and 96 operate in parallel in the manner of a single rear signaling lamp in the circuits described with respect to FIGURES 1 and 2. The right rear signaling lamps 104 and 20 are connected in parallel in a similar manner with a warning lamp 110 connected thereacross for providing indications to the motor vehicle operator of right rear lamp filament failure. It should be noted that when there is filament failure during tail light operation, the warning lamps 102 or 110 will indicate this failure by a steady glow, while such filament failure during night turn signal operation is indicated by a flashing or blinking of the warning lamps.

In addition, the circuit of FIGURE 3 comprises a plurality of added contacts associated with the head light relay winding 76. These contacts include the armature contact 118 which is associated with the contacts 120 and 122, respectively, connected across the filament 130 in the left indicator lamp 126. The remaining filament 128 in indicator lamp 126 is connected between contact 120 and ground. In addition, the armature contact 124 is connected to ground and is operatively associated with the contact 125 which is connected to the indicator lamp filament 130. In the operation of the FIGURE 3 circuit, the energization of the head light relay winding 76 causes the contact 124 to break from contact 125, and also causes the contact 118 to break from contact 120 and to make with the contact 122. As a result, an electrical energizing circuit is completed from the flasher 26 through the contacts 118 and 122 to energize the dual filaments 128 and 130 of indicator lamp 126 in series. Thus, during such night driving operation, the indicator lamp will have a relatively lower intensity output. During daytime driving operation, however, the headlight relay winding 76 is not energized with the result that the two filament windings 128 and 130 are connected in parallel from the energizing circuits to ground. In this event, both filaments are energized equally to provide a relatively higher intensity output under such daylight driving conditions.

The right indicator lamp 132 and its two filaments 134 and 136 are connected in a similar manner through the headlight relay winding contacts 138, 140, 142 and 144 with the result that dual intensity output also is provided therefrom.

Figure 4:
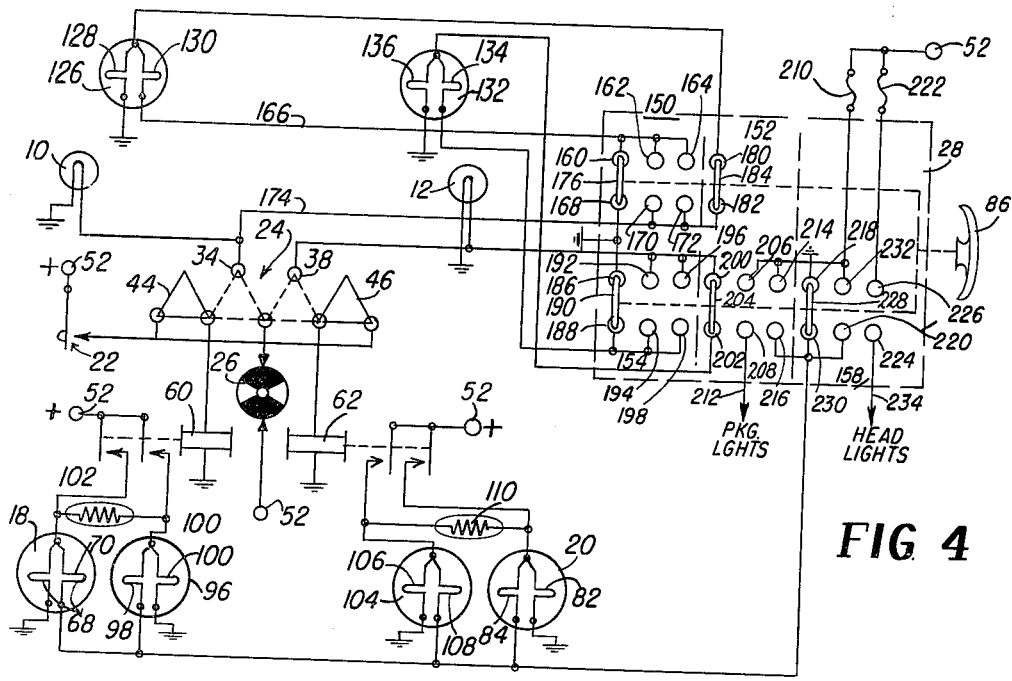
FIGURE 4 is an electrical schematic circuit diagram of a further embodiment of the invention having dual intensity indicator lamps and dual intensity rear lamps and comprising a headlight switch with additional contacts for eliminating the headlight relay.

Referring now to FIGURE 4 of the drawing, there is shown an electrical schematic circuit diagram of still another illustrative embodiment of the invention. The circuit of FIGURE 4 in many respects is similar to the circuit of FIGURE 3 and corresponding circuit elements have been identified by similar reference numerals. The FIGURE 4 circuit, however, differs primarily from the FIGURE 3 circuit in the elimination of the headlight relay 76. This has been achieved by the provision of certain additional contacts on the headlight switch 28 which serve to perform the circuit make-break functions previously controlled by the headlight relay.

As shown in FIGURE 4, this embodiment comprises a left indicator lamp 126 of the dual filament type, a right indicator lamp 132 of the dual filament type, left and right front turn signal lamps 10 and 12, respectively, left rear signaling lamps 18 and 96, which are connected in parallel and are of the dual filament type, and right rear signaling lamps 20 and 104, which also are connected in parallel and are of the dual filament type. Each pair of rear signaling lamps is provided with a warning lamp, such as lamp 102 or lamp 110, connected thereacross to indicate filament failure in the rear signaling lamps, in the manner described hereinabove with respect to the FIGURE 3 circuit.

The FIGURE 4 embodiment differs primarily from the FIGURE 3 circuit in that the headlight switch 28 comprises a plurality of contacts which are adapted to make and break electrical circuits in each of the three operative positions of the headlight switch. Those skilled in the art will appreciate that when the headlight switch knob 86 is in its normal, fully in position, neither the headlights or the parking lights of the automobile are energized. When the headlight switch knob 86 is pulled outwardly to its first operative position, the headlights of the automobile are still not energized but the parking lights are energized in accordance with well understood operation. When the headlight switch knob 86 is pulled all the way out, then the headlights are fully energized as required for night driving operation.

In accordance with a feature of this invention, the headlight switch 28 shown in the circuit of FIGURE 4 comprises five banks of contacts, each contact bank having the three operating positions described hereinabove. Thus, the contact bank 150 comprises the contacts 160, 162, and 164 which are connected together by the conductor 166 to the filament 130 in the left indicator lamp 126. Contact bank 150 also comprises the contacts 170 and 172 which are connected together by the conductor 174 to the contact 34 in the turn signal switch 24. Contact 168 in contact bank 150 is connected to ground. A contact wiper 176 is mechanically coupled to the headlight switch knob 86 such that when the knob is in the fully in position, a circuit is completed between contacts 160 and 168 of contact bank 150. Under these conditions, the filament 130 of left indicator lamp 126 is connected to ground so as to be in parallel with the remaining filament 128 in the left indicator lamp 126. Thus, when the knob 86 of the headlight switch is fully in under normal daytime driving conditions, the left indicator lamp 126 will have an output of a relatively higher intensity.

When the headlight switch knob 86 is pulled outwardly to the parking light position or to its outermost headlight energizing position, to thereby close the circuit between contacts 162 and 170 or the circuit between contacts 164 and 172, the filament 130 in the left indicator lamp 126 is connected by the conductor 174 to the stationary contact 34 in the turn signal switch 24. Under these conditions, the left indicator lamp 126 will have a relatively lower output in the manner described hereinabove, such as is desirable under night driving conditions.

Referring now to the contact bank 152 in the headlight switch 28, it can be seen that this contact bank comprises only the contacts 180 and 182 which are bridged by the wiper 184 when the headlight switch push button is in the fully in or daytime driving position. Under these conditions, the junction of the dual filaments in the left indicator lamp 126 will be connected directly to the contact 34 in the turn signal switch 24 to provide a parallel energization of the dual filaments through the flasher 26 under daytime driving conditions, thereby giving a relatively higher intensity output. When the headlight switch knob 86 is pulled outwardly to the parking light or headlight energization position, the dual filaments 128 and 130 in left indicator lamp 126 can only be energized in series to give the desired relative lower output during night driving operations.

The contact bank 154 is similar to the contact bank 150 but is connected to control the right indicator lamp 132 for each operating position of the headlight switch. Thus, in the daytime or fully in position of the headlight switch knob 86, the contacts 186 and 188 are bridged by the wiper 190 to connect the filament 134 of right indicator lamp 132 to ground. This permits dual filaments to be energized parallel for relatively higher output during daytime driving operation. However, when the headlight switch knob 86 is pulled to the parking light or headlight energization position, then the contacts 192 and 194 or 196 and 198, are respectively bridged by the wiper 190 to connect the junction of the dual filaments in the right indicator lamp 132 to the contact 38 in the turn signal switch 24. As explained hereinabove, this permits a relatively lower flashing output from the right indicator lamp 132 under night driving operations.

The contact bank 156 of the headlight switch 28 comprises a pair of contacts 200 and 202 which are connected by the wiper 204 when the headlight switch knob 86 is in its fully in position. This serves to connect the junction of the dual filaments 134 and 136 in the right indicator lamp 132 to ground to permit the two filaments to be energized in parallel under daytime driving operation. When the knob 86 is pulled outwardly to its parking light position, this permits the contact 206 to be connected by wiper 204 to the contact 208, thereby completing a circuit from the power supply positive terminal 52 and the fuse 210 to the parking light power lead 212 to thereby energize the parking lights of the automobile. When the headlight knob 86 is pulled all of the way out, this enables the contact 214 to be electrically connected by the wiper 204 to the contact 216 to thereby complete the circuit between the power supply terminal 52 and the filaments of each of the rear signaling lamps 18, 96, 104 and 20. Those skilled in the art will appreciate that this serves to energize the rear running lights under night driving conditions. It also will be noted that each of the dual filaments in each rear lamp are energized in series so as to provide a relatively lower output under night driving operation.

Referring to the contact bank 158, it can be seen that the fully in position of the headlight knob 86 completes an electrical circuit from ground, through the contact 218, the wiper 228 and the contact 230 to the filaments 84, 108, 98 and 70 of the rear signaling lamps. This causes the dual filaments in each rear signaling lamp to be connected in parallel to provide a relatively higher intensity output under daylight driving conditions. When the headlight knob 86 is pulled out to the parking light position, a circuit is completed between the contacts 232 and 220 by the wiper 228 to connect the positive power supply terminal 52 to the aforementioned filaments in the rear signaling lamps to cause these lamps to have their filaments energized in series to provide a relatively lower intensity rear running light. However, when the headlight switch knob 86 is pulled to its outermost or headlight energization position, the wiper 228 completes a circuit between the contacts 226 and 224 to cause the headlight power lead 234 to be energized from the positive power supply terminal 52 through the fuse 222.

Thus, it can be seen, from the above detailed description of the construction and operation of the FIGURE 4 circuit, that all of the desired operations for dual intensity energization of the novel illuminating and signaling circuit may be achieved without the necessity of a headlight relay, as in the case of the circuits of FIGURES 1, 2, and 3 described above. This elimination of the headlight relay has been effected by the provision of the additional contacts on the headlight switch 28 which provide the desired circuit make-break operations for each of the three headlight switch positions.

Figure 5:
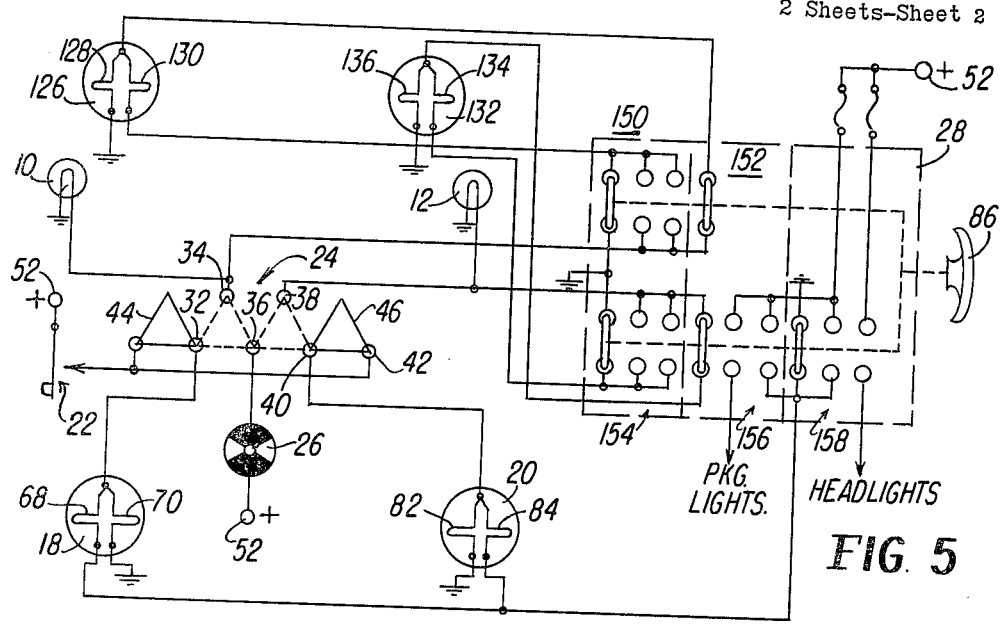
FIGURE 5 is an electrical schematic circuit diagram of a still further illustrative embodiment of the invention having dual intensity indicator lamps and dual intensity rear lamps, and comprising a headlight switch with additional contacts for eliminating all relays from the illuminating and signaling circuit.

Still another advantageous circuit embodiment of the present invention is shown in FIGURE 5 of the drawing. The FIGURE 5 circuit is similar to the FIGURE 4 circuit with the exception that only two rear signaling lamps are shown and with the further exception that all operating relays have been eliminated. In particular, the turn switch relays 60 and 62 which are used in the FIGURE 4 circuit for controlling the rear signaling lamps have been eliminated in the circuit of FIGURE 5 by the particular connections of the additional headlight switch contacts as described in detail hereinbelow.

Since many of the elements of the FIGURE 5 circuit correspond to the elements described with respect to the FIGURE 4 circuit, they are identified by similar reference numerals and are not described further herein. Referring specifically to the headlight switch 28, it can be seen that five contact banks are provided, wherein each contact bank includes up to three pairs of contacts corresponding to the fully in, the parking light, and the headlight energization positions of the headlight switch knob 86. Since each of these contact banks 150, 152, 154, 156 and 158 correspond to the related contact banks of the headlight switch 28 in the circuit of FIGURE 4, their operation is well understood from the above description and need not be repeated herein.

In accordance with the novel feature of the FIGURE 5 circuit, the turn signal relays are eliminated by connecting the contact 32 of the turn signal switch 24 directly to the junction of the filaments 68 and 70 in the rear signaling lamp 18 and by connecting the contact 40 of the turn signal switch 24 directly to the junction of the dual filaments 82 and 84 in the right rear signaling lamp 20. Thus, these rear signaling lamps are energized directly upon proper operation of the turn signal switch 24 or upon operation of the brake stop switch 22. It will be appreciated that the circuit of FIGURE 5 is a highly desirable embodiment since the elimination of all relays has materially reduced the number of components and the construction cost of the inventive illuminating and signaling circuit.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of a dual intensity electrical illuminating and signaling system for use in a motor vehicle having illuminating lamps, signaling lamps and turn indicator lamps comprising an electrical power source; a stop signal and turn signal circuit connected to said power source; a headlight switching circuit connected to said power source; said stop signal and turn signal circuit comprising a rear lamp having a pair of filaments, a turn signal switch, a stop signal switch, first circuit means responsive to the operation of said turn signal switch or said stop signal switch for connecting said pair of filaments in parallel to said power source for providing a rear lamp signal output at a relatively higher intensity level under daylight driving conditions, and second circuit means responsive to the operation of said headlight switching circuit for connecting said pair of filaments in series to said power source for providing a rear lamp illuminating output under night driving conditions, said second circuit means also serving upon operation of said headlight switching circuit to inhibit the energization of one of said pair of filaments by said turn signal or stop signal switches to thereby provide a rear lamp signal output at a relatively lower intensity level under night driving conditions.

2. The improvement of a dual intensity electrical turn signal system for use in a motor vehicle comprising an electrical power source; a turn signal circuit connected to said power source; a headlight switching circuit connected to said power source; said turn signal circuit comprising a rear lamp having a pair of filaments, a turn signal switch, a flasher adapted to be connected to said turn signal switch, first circuit means responsive to the operation of said turn signal switch for connecting said pair of filaments in parallel to said power source and said flasher for providing a rear lamp flashing turn signal output at a relatively higher intensity level under daylight driving conditions, and second circuit means responsive to the operation of said headlight switching circuit for inhibiting the energization of one of said pair of filaments by said turn signal switch to thereby provide a rear lamp flashing turn signal output at a relatively lower intensity level under night driving conditions.

3. The improvement of a dual intensity electrical illuminating and signaling system for use in a motor vehicle having illuminating lamps, signaling lamps and turn indicator lamps comprising an electrical power source; a stop signal and turn signal circuit connected to said power source; a headlight switching circuit connected to said power source; said stop signal and turn signal circuit comprising a rear lamp having a pair of filaments, a turn signal switch, a stop signal switch, first electromagnetic relay means responsive to the operation of said turn signal switch or said stop signal switch for connecting said pair of filaments in parallel to said power source for providing a rear lamp signal output at a relatively higher intensity level under daylight driving conditions, and second electromagnetic relay means responsive to the operation of said headlight switching circuit for connecting said pair of filaments in series to said power source for providing a rear lamp illuminating output under night driving conditions, said second electromagnetic relay means also serving upon operation of said headlight switching circuit to inhibit the energization of one of said pair of filaments by said turn signal or stop signal switches to thereby provide a rear lamp signal output at a relatively lower intensity level under night driving conditions.

4. The improvement of a dual intensity electrical signaling system comprising an electrical power source; a signaling circuit connected to said power source; a switching circuit connected to said power source; said signaling circuit comprising a lamp having a pair of filaments, a flashing signal switch, a first circuit means responsive to the operation of said flashing signal switch for connecting said pair of filaments in parallel to said power source for providing a lamp flashing signal output at a relatively higher intensity level, and second circuit means responsive to the operation of said switching circuit for connecting said pair of filaments in series to said power source for providing a lamp constant illuminating output, said second circuit means also serving upon operation of said switching circuit to inhibit the energization of one of said pair of filaments by said flashing signal switch to thereby provide a lamp flashing signal output at a relatively lower intensity level.

5. The improvement of a dual intensity electrical illuminating and signaling system for use in a motor vehicle having illuminating lamps, signaling lamps and turn indicator lamps comprising an electrical power source; a stop signal and turn signal circuit connected to said power source; a headlight switching circuit connected to said power source; said stop signal and turn signal circuit comprising a pair of rear lamps each having a pair of filaments, a turn signal switch, first circuit means responsive to the operation of said turn signal switch for selectively connecting the pair of filaments in one of said rear lamps in parallel to said power source for providing a rear lamp signal output at a relatively higher intensity level under daylight driving conditions, and second circuit means responsive to the operation of said headlight switching circuit for inhibiting the further energization of one of said pair of filaments of the energized rear lamp by said turn signal switch to thereby provide a rear lamp signal output at a relatively lower intensity level under night driving conditions.

6. The improvement of a dual intensity electrical illuminating and signaling system for use in a motor vehicle having illuminating lamps, signaling lamps and turn indicator lamps comprising an electrical power source; turn signal circuit connected to said power source; a headlight switching circuit connected to said power source; said turn signal circuit comprising a rear lamp having a pair of filaments, a turn signal switch, a flasher, first circuit means responsive to the operation of said turn signal switch for connecting said pair of filaments in parallel with said power source under control of said flasher for providing a rear lamp flashing signal output at a relatively higher intensity level under daylight driving conditions, and second circuit means responsive to the operation of said headlight switching circuit for connecting said pair of filaments in series to said power source for providing a rear lamp illuminating output under night driving conditions, said second circuit means also serving upon operation of said headlight switching circuit to inhibit the energization of one of said pair of filaments by said turn signal switch to thereby provide a rear lamp flashing signal output at a relatively lower intensity level under night driving conditions, said first circuit means also serving to connect an indicator lamp in series with said rear lamp upon operation of said turn signal switch to provide a flashing indicator signal output of relatively higher intensity during daylight driving conditions and of relatively lower intensity during night driving conditons.

7. The improvement of a dual intensity electrical illuminating and signaling system in accordance with claim 6 wherein said indicator lamp serves to indicate by change of intensity output any filament failure in said rear lamp and further comprising a conductive circuit element connected thereacross to maintain the energization of said rear lamp in the event of filament failure in said indicator lamp.

8. The improvement of a dual intensity electrical illuminating and signaling system for use in a motor vehicle having illuminating lamps, signaling lamps and turn indicator lamps comprising an electrical power source; a turn signal circuit connected to said power source; a headlight switching circuit connected to said power source; said turn signal circuit comprising a pair of parallel connected rear lamps each having a pair of filaments, a turn signal switch, first circuit means responsive to the operation of said turn signal switch for connecting the pair of filaments in each rear lamp in parallel to said power source for providing a rear lamp signal output at a relatively higher intensity level under daylight driving conditions, and second circuit means responsive to the operation of said headlight switching circuit for connecting the pair of filaments of each rear lamp in series with said power source for providing a rear lamp illuminating output under night driving conditions, said second circuit means also serving upon operation of said headlight switching circuit to inhibit the energization of one of said pair of filaments in each rear lamp by said turn signal switch to thereby provide a rear lamp signal output at a relatively lower intensity level under night driving conditions.

9. The improvement of a dual intensity electrical illuminating and signaling system in accordance with claim 8 further comprising a warning lamp connected between the filaments of said pair of rear lamps for indicating by its energized condition the existence of a filament failure in either of said pair of rear lamps.

10. The improvement of a dual intensity electrical illuminating and signaling system for use in a motor vehicle having illuminating lamps, signaling lamps and turn indicator lamps comprising an electrical power source; a turn signal circuit connected to said power source; a headlight switching circuit connected to said power source; said turn signal circuit comprising a rear lamp having a pair of filaments, an indicator lamp having a pair of filaments, and a turn signal switch, first circuit means responsive to the operation of said turn signal switch for connecting the pair of filaments in each of said rear and indicator lamps in parallel to said power source for providing an indicator lamp and a rear lamp signal output at a relatively higher intensity level under daylight driving conditions, and second circuit means responsive to the operation of said headlight switching circuit for inhibiting the energization of one of said pair of filaments in each of said indicator and rear lamps by said turn signal switch to thereby provide an indicator and rear lamp signal output at a relatively lower intensity level under night driving conditions.

11. The improvement of a dual intensity electrical illuminating and signaling system for use in a motor vehicle having illuminating lamps, signaling lamps and turn indicator lamps comprising an electrical power source; a turn signal circuit connected to said power source; a headlight switching circuit comprising a plurality of selectively operable contacts adapted to be connected to said power source; said turn signal circuit comprising a rear lamp having a pair of filaments, a turn signal switch, first circuit means responsive to the operation of said turn signal switch for connecting said pair of filaments in parallel to said power source for providing a rear lamp signal output at a relatively higher intensity level under daylight driving conditions, and second circuit means responsive to the selective operation of the contacts within the headlight switching circuit for connecting said pair of filaments in series to said power source for providing a rear lamp illuminating output under night driving conditions, said second circuit means also serving upon the selective operation of said contacts within headlight switching circuit to inhibit the energization of one of said pair of filaments by said turn signal switch to thereby provide a rear lamp signal output at a relatively lower intensity level under night driving conditions.

12. The improvement of a dual intensity electrical illuminating and signaling system for use in a motor vehicle having illuminating lamps, and turn indicator lamps comprising an electrical power source; a turn signal circuit connected to said power source; an illuminating switching circuit including a plurality of selectively operable daylight, parking light and headlight contacts adapted to be connected to said power source; said turn signal circuit comprising a turn signal lamp having a pair of filaments, a turn signal switch, first circuit means responsive to the operation of said turn signal switch for connecting said pair of filaments in parallel to said power source for providing a turn signal lamp signal output at a relatively higher intensity level under daylight driving conditions, and second circuit means responsive to the selective operation of said illuminating switching circuit to said parking light and parking light contacts for connectng said pair of filaments in series with said power source for providing an illuminating lamp output under night driving conditions, said second circuit means also serving upon operation of said headlight switching circuit to said parking light and headlight contacts to inhibit the energization of one of said pair of filaments by said turn signal or stop signal switches to thereby provide a turn signal lamp output at a relatively lower intensity level under night driving conditions.

References Cited by the Examiner

UNITED STATES PATENTS

| | | | |
|---|---|---|---|
| 625,219 | 5/1899 | Truitt | 315—191 |
| 1,112,903 | 10/1914 | Ham | 315—191 |
| 2,501,017 | 3/1950 | Abrums | 315—191 |
| 3,148,306 | 9/1964 | Onksen et al. | 315—82 |

GEORGE N. WESTBY, *Primary Examiner.*